United States Patent Office 3,335,147
Patented Aug. 8, 1967

3,335,147
ANILINO-PYRIDINIUM-MALEIMIDES
Marvin J. Karten, Yonkers, N.Y., assignor to U.S. Vitamin & Pharmaceutical Corporation, a corporation of Delaware
No Drawing. Filed Apr. 29, 1965, Ser. No. 451,971
9 Claims. (Cl. 260—295)

This invention relates to anilino-pyridinium-maleimides and to methods for their preparation.

The anilino-pyridinium-maleimides of this invention have the formula

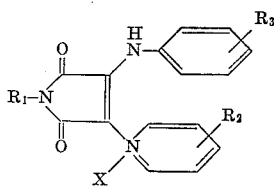

wherein $R_1$ may be alkyl, substituted alkyl, cycloalkyl, aralkyl, heteroaryl, aryl; $R_2$ and $R_3$ may be hydrogen, lower alkyl, lower alkoxy, nitro, or halogen, and may be the same or different; and X is an anion of a mineral acid.

Preferably, $R_1$ is an alkyl containing from 1 to 16 carbons, a lower alkoxy-lower alkyl, a carbethoxy-lower alkyl, a cycloalkyl containing from 5–6 carbon atoms, phenyl, naphthyl, phenyl-lower alkyl, thienyl, furyl, and furfuryl. Examples of preferred $R_1$ groups are methyl, ethyl, butyl, isohexyl, dodecyl, myristyl, cyclohexyl, methoxyethyl, carbethoxymethyl, 1-naphthyl, benzyl, and β-phenethyl.

X is preferably chloride, nitrate, sulfate or phosphate.

The compounds of this invention have potent topical anesthetic activity, and most of the compounds tested exhibited hypotensive activity when administered to mice.

The anilino-pyridinium-maleimides of this invention were conveniently prepared by mixing a molar amount of an appropriately N-substituted 2,3-dichloromaleimide with 2 molar amounts of an appropriately substituted pyridine in an inert solvent. To this mixture a molar amount of a 1-[N-(2-phenylethyl)-2-(4-nitroanilino)-3-maleimidyl]pyridinium nitrate to proceed until no further precipitation occurred. Preferably, the reaction was brought to completion by refluxing the mixture at temperatures above 60° C. for a period of from about 1 to 2 hours. As a solvent I prefer a halogenated hydrocarbon such as chloroform, carbon tetrachloride, or dichloroethane. However, the reaction will proceed in other inert solvents such as, for example, benzene and acetonitrile. By following the procedure set forth above, compounds wherein X is chloride are obtained. By treating these compounds with an appropriate mineral acid such as, nitric, phosphoric or sulfuric acid, the corresponding nitrate, phosphate, or sulfate salt is obtained.

The intermediate N-substituted 2,3-dichloromaleimides were prepared according to the method described by Shapiro, Freedman and Karten in U.S. Patent 3,129,225.

The invention will appear more fully from the examples which follow, which are set forth by way of illustration only; and it is to be understood that it is intended here to cover all changes and modifications of the examples herein which do not constitute departures from the spirit and scope of the invention.

EXAMPLE I

*1-[N-(2-furfuryl)-2-anilino-3-maleimidyl]pyridinium chloride*

To a mixture of 10.0 g. (0.04 mole) of N-(2-furfuryl)-dichloromaleimide in 50 ml. of dichloroethane was added 6.3 g. (0.08 mole) of pyridine. The mixture turned purple and solution occurred. 3.3 g. (0.04 mole) of aniline then was added. The solution became less intense in color. The solution was refluxed for one hour on the steam bath during which time a large quantity of solid precipitated. The mixture was filtered while hot and washed with acetonitrile. The crude solid was recrystallized twice from methanol-ether and dried to give 9.5 g. of product, M.P. 249–251° (dec.).

EXAMPLE II

*N-[1-(2-phenylethyl)-3-(4-nitroanilino)-maleimidyl-4]-pyridinium nitrate*

The above procedure was used except that 4-nitroaniline was employed instead of aniline. The crude product, 12.4 g. was dissolved in 150 ml. of hot water and filtered into 20 ml. of 5N $HNO_3$. The yellow solid which precipitated was filtered, washed with water, ethanol and ether and dried. It weighed 11.8 g. and gave a negative Beilstein test for halogen. It was recrystallized twice from hot water, washed with water, ethanol and ether and dried to give 7.0 g. of a yellow solid, M.P. 210–211°.

In accordance with the procedures described in Examples I and II, the following compounds were prepared:

| $R_1$ | $R_2$ | $R_3$ | X | M.P., ° C. |
|---|---|---|---|---|
| $CH_3$ | H | H | Cl | 284–286 |
| iso-$C_6H_{13}$— | H | H | Cl | 250–252 |
| n-$C_{12}H_{25}$— | H | H | Cl | 235–237 |
| $C_6H_{11}$—a | H | H | Cl | 227–232 |
| $EtO_2CCH_2$— | H | H | Cl | 201–203 |
| $C_6H_5CH_2CH_2$— | H | H | Cl | 235–236 |
| $C_4H_3OCH_2$—b | H | H | Cl | 249–251 |
| $C_6H_5$ | H | H | Cl | 248–250 |
| $C_{10}H_7$—c | H | H | Cl | 244–246 |
| $C_6H_5CH_2$— | H | H | Cl | 245–248 |
| $C_6H_5CH_2CH_2$— | 4-$CH_3$— | H | Cl | 225–230 |
| $C_6H_5CH_2CH_2$— | 4-n-$C_5H_{11}$— | H | Cl | 215–216 |
| $C_6H_5CH_2CH_2$— | H | 4-$CH_3$— | Cl | 239–241 |
| $C_6H_5CH_2CH_2$— | H | 4-$O_2N$— | $NO_3$ | 210–211 |
| $C_6H_5CH_2CH_2$— | H | 4-$CH_3O$— | $NO_3$ | 243–244 |
| $C_6H_5CH_2CH_2$— | H | 2-$CH_3O$— | $NO_3$ | 101–106 |
| $C_6H_5CH_2CH_2$— | H | H | $HSO_4$ | 145–148 | a Cyclohexyl.  b 2-furfuryl.  c 1-naphthyl.

I claim:
1. A compound of the formula

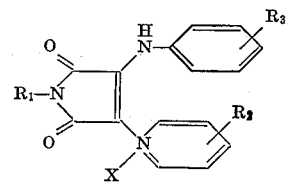

wherein
  $R_1$ is selected from the group consisting of an alkyl having from 1–16 carbons, a lower alkoxy-lower alkyl, a carbethoxy-lower alkyl, a cycloalkyl having from 5–6 carbons, phenyl, naphthyl, phenyl-lower alkyl, furyl, and furfuryl;
  $R_2$ and $R_3$ are selected from the group consisting of hydrogen, lower alkyl, lower alkoxy, nitro and halogen, and may be the same or different; and
  X is an anion of a mineral acid.
2. The compound of claim 1 wherein
  $R_1$ is n-$C_{12}H_{25}$,
  $R_2$ and $R_3$ are H, and
  X is Cl.
3. Thee compound of claim 1 wherein
  $R_1$ is cyclohexyl,
  $R_2$ and $R_3$ are H, and
  X is Cl.

4. The compound of claim 1 wherein
$R_1$ is 2-furfuryl,
$R_2$ and $R_3$ are H, and
X is Cl.
5. The compound of claim 1 wherein
$R_1$ is β-phenethyl,
$R_2$ is 4-(n-amyl),
$R_3$ is H, and
X is Cl.
6. The compound of claim 1 wherein
$R_1$ is β-phenethyl,
$R_2$ is H,
$R_3$ is 2-methoxy, and
X is $NO_3$.
7. A process for preparing a compound of the formula

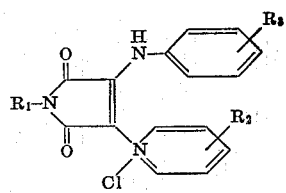

wherein
$R_1$ is selected from the group consisting of an alkyl having from 1–16 carbon atoms, a lower alkoxy-lower alkyl, a carbethoxy-lower alkyl, a cycloalkyl having from 5–6 carbon atoms, phenyl, naphthyl, phenyl-lower alkyl, and furfuryl; and
$R_2$ and $R_3$ are selected from the group consisting of hydrogen, lower alkyl, lower alkoxy, nitro, and halogen, and may be the same or different which comprises the steps of preparing a mixture of a molar amount of a compound of the formula

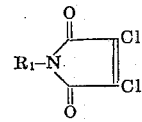

with a two-molar amount of a compound of the structure

in an inert solvent, adding to said mixture a molar amount of a compound of the formula

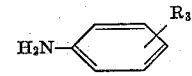

wherein $R_1$, $R_2$ and $R_3$ are the same as above, and permitting reaction mixture to stand until no further precipitation occurs.
8. A process according to claim 7 wherein the inert solvent is selected from the group consisting of dichloroethane and benzene.
9. A process according to claim 7 wherein the reaction mixture is kept at a temperature above 60° C. for about 2 hours.

References Cited

UNITED STATES PATENTS 2,592,273   4/1952   Goebel et al. _____ 260—567.6

WALTER A. MODANCE, *Primary Examiner.*

JOHN D. RANDOLPH, *Examiner.*

A. L. ROTMAN, *Assistant Examiner.*